(12) United States Patent
Massieu et al.

(10) Patent No.: US 6,435,411 B1
(45) Date of Patent: Aug. 20, 2002

(54) OPTOELECTRONIC DEVICE FOR ACQUISITION OF IMAGES, IN PARTICULAR OF BAR CODES

(75) Inventors: Jean-Louis Massieu, Montauban; Jean-Michel Puech, Toulouse, both of (FR)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/403,455

(22) PCT Filed: Apr. 21, 1998

(86) PCT No.: PCT/FR98/00802

§ 371 (c)(1),
(2), (4) Date: Oct. 21, 1999

(87) PCT Pub. No.: WO98/48370

PCT Pub. Date: Oct. 29, 1998

(30) Foreign Application Priority Data

Apr. 21, 1997 (FR) .............................. 97 05102

(51) Int. Cl.⁷ .................................................. G06K 7/10
(52) U.S. Cl. .............. 235/454; 235/462.43; 235/462.45
(58) Field of Search ......................... 235/454, 462.35, 235/462.43, 462.45, 462.22, 462.23

(56) References Cited

U.S. PATENT DOCUMENTS

| | | | |
|---|---|---|---|
| 4,408,120 A | | 10/1983 | Hara et al. |
| 4,794,238 A | * | 12/1988 | Hampton ..................... 235/462 |
| 5,043,569 A | | 8/1991 | Iima et al. |
| 5,291,008 A | * | 3/1994 | Havens et al. ............... 235/462 |
| 5,354,977 A | * | 10/1994 | Roustaei ...................... 235/472 |
| 5,397,885 A | | 3/1995 | Massieu et al. |
| 5,449,892 A | * | 9/1995 | Yamada ........................ 235/462 |

FOREIGN PATENT DOCUMENTS

| | | |
|---|---|---|
| EP | 0101939 A2 | 3/1984 |
| EP | 0524349 A1 | 1/1993 |
| FR | 2673738 A1 | 9/1992 |
| JP | 62147579 A * | 7/1987 ............ G06K/7/10 |
| JP | 63067692 A * | 3/1988 ............ G06K/7/10 |
| WO | WO 93-14471 | 7/1993 |
| WO | WO 94/22104 | 9/1994 |

* cited by examiner

*Primary Examiner*—Michael G. Lee
*Assistant Examiner*—April A. Nowlin
(74) *Attorney, Agent, or Firm*—Seed IP Law Group PLLC

(57) ABSTRACT

An optoelectronic device for acquisition of images of objects, such as barcodes, includes a lighting system which is designed such that the axis of the light beam intersects the optical axis. A reflector that allows the image beam to pass through, and can reflect the light beam, is disposed such as to intercept the light beam, and is inclined relative to the optical axis, by an angle which is such that the light beam is centered on the optical axis. The lighting system is designed to light the useful optical field throughout the entire depth of the field, and the angle α, in which the lighting system is seen from the object plane, is such that $$\alpha \le \text{Arc tg}\frac{L}{5P},$$

in which L is the width of the object plane, and P is the distance between the object and the lighting system.

32 Claims, 6 Drawing Sheets

OPTOELECTRONIC DEVICE FOR ACQUISITION OF IMAGES, IN PARTICULAR OF BAR CODES

The invention relates to an optoelectronic device for acquisition of images, in particular of bar codes.

The present optoelectronic devices which are designed for reading of bar codes conventionally comprise a case which contains an electronic scanning sensor, optical means which make it possible to form images on the sensor, and to define an optical plane together with the latter, and electroluminescent diodes which are designed to light the bar codes, and to permit acquisition of the images on the sensor. Finally, these devices comprise processing electronics which permit piloting of the sensor, and processing of the signals obtained from the latter.

Most of the present optoelectronic devices are provided with electro-luminescent diodes which are offset relative to the optical plane, so as not to interfere with the beams which are reflected by the bar code. Devices of this type, which are described in particular in patents U.S. Pat. Nos. 5,397,885, 4,408,120 and EP 101 939, have the disadvantage that they have errors of parallax which, in practice, lead to limitations of their possibility of use, and in particular to a very short permissible reading distance.

In addition, the arrangement of the electroluminescent diodes of these devices is such that the beams of the various diodes overlap only very partially.

Firstly, the brightness of the diodes conventionally used is highly disparate, and in fact the class of brightness of these diodes can vary between 1 and 4. As a result of this disparity, when the diodes age, it is found that there are local attenuations of the brightness intensity, which are not distributed and correlated throughout the width of the field of reading, and can lead to lack of recognition of the bar codes, derived from extraction of binary signals which do not emerge from the noise threshold of the processing electronics.

Secondly, this arrangement of the diodes leads to reduction of the performance of the device, when any one of the said diodes burns out.

Finally, for most of the present optoelectronic devices, the arrangement of the diodes leads to lighting of areas on both sides of the bar codes, which are beyond the useful field of reading. This gives rise to an ergonomic problem, consisting of the difficulty of positioning the device adequately opposite the bar codes, in particular if the latter are relatively long. This then also results in a problem of loss of energy.

The optoelectronic device which is described in patent application FR-2 673 738 makes it possible to eliminate one of the disadvantages of the aforementioned devices, i.e. the disadvantage relating to the errors of parallax. In fact, this device comprises electro-luminescent diodes which are disposed substantially in the optical plane, outside the optical field of reading, and are designed to create beams which cover a band with a height of between 1 and 6 mm on both sides of the optical plane. As already stated, a device of this type, the diodes of which are disposed in the optical plane, makes it possible to avoid errors of parallax, and consequently permits distance reading of the bar codes. On the other hand, it has the other aforementioned disadvantages relating to lack of overlapping of the beams of the diodes, and lighting of areas which are outside the field of reading.

Other optoelectronic devices, such as described in international patent application WO-14471 and patent EP-524349, also make it possible to eliminate the disadvantage relative to the errors of parallax.

For this purpose, according to these devices:
the lighting means are disposed downstream from the optical means, and are disposed such that the axis of the light beam intersects the optical axis;
reflection means which can allow the image beam to pass through, and can reflect the light beam, are disposed such as to intercept the said light beam;
the said reflection means are inclined relative to the optical axis, by an angle which is such that the light beam is centred on the said optical axis; and
the said reflection means, lighting means and lens are disposed such that the distance between the object and the lens is substantially identical to the distance between the object and the lighting means.

However, as in the previous cases, they do not make it possible to solve the aforementioned disadvantages relating to lack of overlapping of the beams of the diodes, and to lighting of areas outside the field of reading. In addition, they give rise to an additional disadvantage, since the reflection means consist of semi-reflective mirrors. Reflective mirrors of this type lead to recovery of 25% at the most of the lighting energy emitted, at the level of the image. Consequently, they require use of powerful lighting sources which are incompatible with autonomous devices.

The object of the present invention is to eliminate all of the above-described disadvantages of the present optoelectronic devices, and its main objective is to provide an optoelectronic device which combines the following advantages: substantial depth of field, regular reduction of the light beam across the width of the useful field of reading, clear delimitation of the edges of the lit area, and low electrical energy consumption.

For this purpose, the invention relates to an optoelectronic device for acquisition of images of objects, in particular of bar codes, comprising a case which is provided with a reading window and contains an electronic scanning sensor, lighting means, and optical means which permit the formation of images on the sensor and comprise a lens, the sensor and the optical means defining an optical axis relative to which the reading window is centred, the said sensors, reading window and optical means delimiting a useful optical reading field. This optoelectronic device comprises the characteristics previously described (with reference to WO-14471 and EP-524349), and, according to the invention, the following characteristics:
the lighting means comprise a lighting source which is designed to light the useful optical field throughout the entire depth of the field;
the angle $\alpha$, from which the lighting source is seen from the object plane, is such that $$\alpha \leq \text{Arctg}\frac{L}{5P},$$

in which L=width of the object plane, and
P=the distance between the object and the lighting source.

An optoelectronic device of this type is designed to obtain:
a light beam which is designed to light the optical reading field throughout the depth of the field C of the said device, and thus approaches the light beam which is emitted by a point source. (It should be noted that the depth of the field C conventionally means the reading range which is delimited by the maximum and minimum distances of work of the device, which depend on the performance of the optical and electronic processing means); and superimposition of the vertices of the angle of emission of the lighting source and of the optical reading angle.

In fact, as a result of the arrangement of the lens and of the lighting source:

the vertex of the angle which subtends the optical reading field is on the entrance pupil of the lens; and the lighting source, the main axis of which is co-axial relative to the optical axis, has an angle of emission, the virtual image of the vertex of which, seen from the object, coincides substantially with the entrance pupil of the lens.

These two operating characteristics, which make it possible to obtain quasi-superimposition of the lighting area and of the optical area, provide the following advantageous results:

regular reduction of the lighting of the optical field, if the brightness of the lighting source decreases over a period of time, and consequently lack of local attenuation of the light intensity, throughout the depth of the field. As a result, the performance of the device is more stable over a period of time, and consequently the reliability of the latter is also more stable over a period of time;

accurate delimitation of the optical area, as a result of the superimposition of the lit area and the reading area, and consequently sharpness of the edges of the lit area; and increased depth of field, as a result of the lack of parallax error, which depth is limited only by the sensitivity of the sensor and of the lighting power, and not by the parallax faults.

According to another characteristic of the invention, the reflection means comprise a reflective surface which is provided with a slot which is centred on the optical axis, and is disposed such as to intercept the light beam, the said reflective surface being inclined relative to the optical axis, by an angle which is adapted such that the light beam reflected is centred on the said optical axis.

An arrangement of this type makes it possible to recuperate a maximum, and approximately 80% of the lighting energy emitted. In fact, the reflection means are provided with an aperture which is used by the optical path. It should however be noted that lighting means of this type produce a beam which is slightly convergent vertically. In fact, the reflection means break the light beam down into two secondary light beams, which are non-coplanar relative to the optical plane. However, the slot is sufficiently narrow to introduce a very slight parallax error, such that the lit area corresponding to the depth of field is sufficient.

In addition, in order to minimise the loss of energy of the light beam, the reflective surface has vertically in its median portion the shape of an S, which is provided with a substantially vertical wing, in which the slot is provided.

In addition, this reflective surface is preferably articulated on a fixed support, by means of an axial hinge system, and adjustment means are disposed above the said reflective surface, such as to be supported on the latter, and to permit adjustment of its inclination, and/or to make it pivot.

These adjustment means additionally also consist of two screws, which are disposed perpendicularly relative to each of the longitudinal ends of the reflective surface.

In addition, in order to avoid any risk of warping, the reflective surface comprises an upper stiffening edge.

According to another characteristic of the invention, the lighting means comprise at least two diodes which are disposed one in the vicinity of the other, or which are disposed in the vicinity of each other, such as to obtain substantially total overlapping of the light beams of each diode throughout the entire depth of the field.

According to this characteristic, the point source is approached by using at least two point sources, which are disposed such as to obtain a relatively regular light beam, which, as previously stated, leads to regular reduction of the lighting when the diodes age.

In addition, in this case, the device according to the invention makes it possible to eliminate disparities of brightness of the diodes, as a result of the substantially total overlapping of the beams of the diodes.

Finally, according to this characteristic, even if a diode burns out, the device can continue to be operational, since the loss of intensity is applied substantially regularly over the lighting field as a whole, rather than locally.

According to another characteristic of the invention, the lighting means comprise diodes which have an angle of diffusion which is greater than the optical angle, and associated optical means which are disposed such as to intercept the light beam of the said diodes, and are designed to make the said light beam converge in the direction of reduction of the angles of emission, such as to reduce the latter to a value which is conjugated with that of the optical angle.

This preferred embodiment makes it possible to obtain an optoelectronic device which combines the aforementioned advantages, by means of electro-luminescent diodes which are of a conventional type, and thus have a low cost price. An optoelectronic device of this type is particularly suitable for permitting reading of images at distance of approximately 5 cm to 50 cm, and has increased sensitivity owing to the presence of optical means which are associated with the diodes, which focus the maximum light intensity onto the optical reading field.

According to another characteristic of the invention, the optical means which are associated with the diodes comprise a convex focussing lens, which is designed to intercept the light beam for the diodes as a whole.

In addition, this focussing lens preferably comprises a convex dioptre with a toroidal shape. (By toroidal shape is meant a dioptre which conventionally has a radius of curvature in a first plane which is parallel to the light beam, and a radius of curvature which is much smaller, according to a plane which is at right-angles to the said first plane).

As well as permitting focussing of the light beam according to a plane which is at right-angles to the bar code, as previously stated, this toroidal shape of the dioptre makes it possible to focus this beam according to a direction which is parallel to the bar codes, and thus to obtain a thin light beam which is centred on the optical axis.

According to another characteristic of the invention, the focussing lens is a flat-convex lens, and comprises a flat dioptre which is provided with a recess designed to accommodate the electro-luminescent diodes.

In addition, the recess of the flat dioptre of this lens is preferably filled with a resin which has the same refraction index as the said lens.

This arrangement has the advantage that it provides a global general lighting angle, which is defined by the additional dioptre, and is substantially equivalent to the lighting angles of the diodes.

In fact, owing to the presence of the resin, the light beams which are provided by the chips of the diodes do not undergo any deflection upstream from the convex dioptre of the lens.

Other characteristics, objects and advantages of the invention will become apparent from the following detailed description provided with reference to the attached drawings, which represent a non-limiting example of a preferred embodiment. In the drawings which are an integral part of the invention:

Figure 5A:
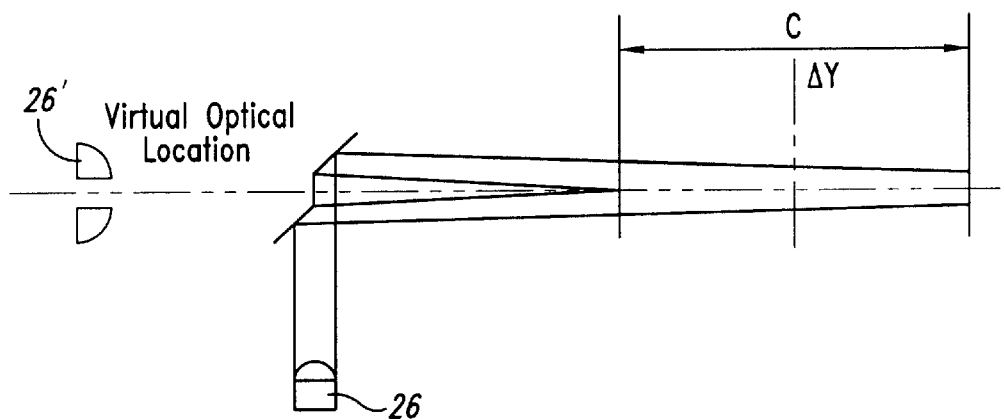
Figure 5B:
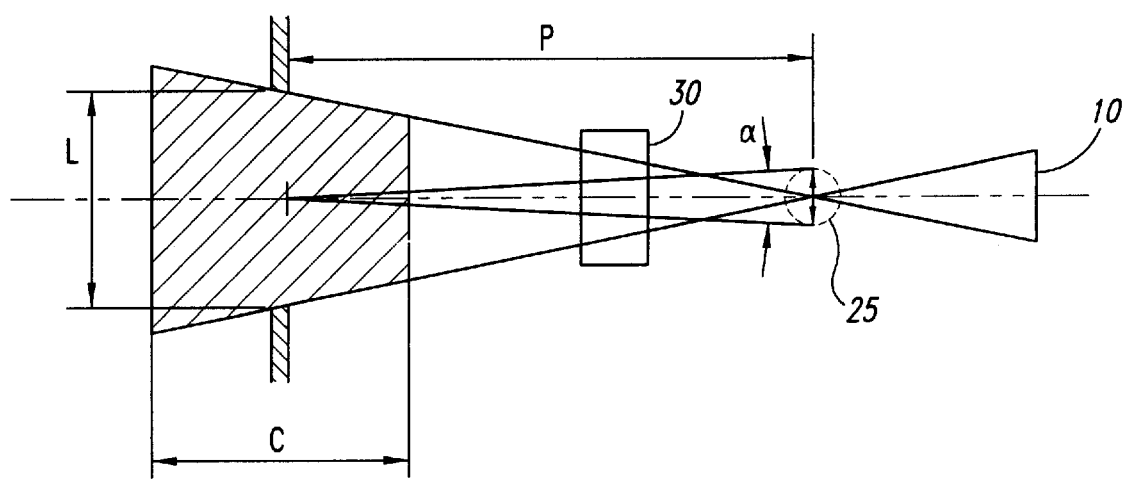
Figure 6:
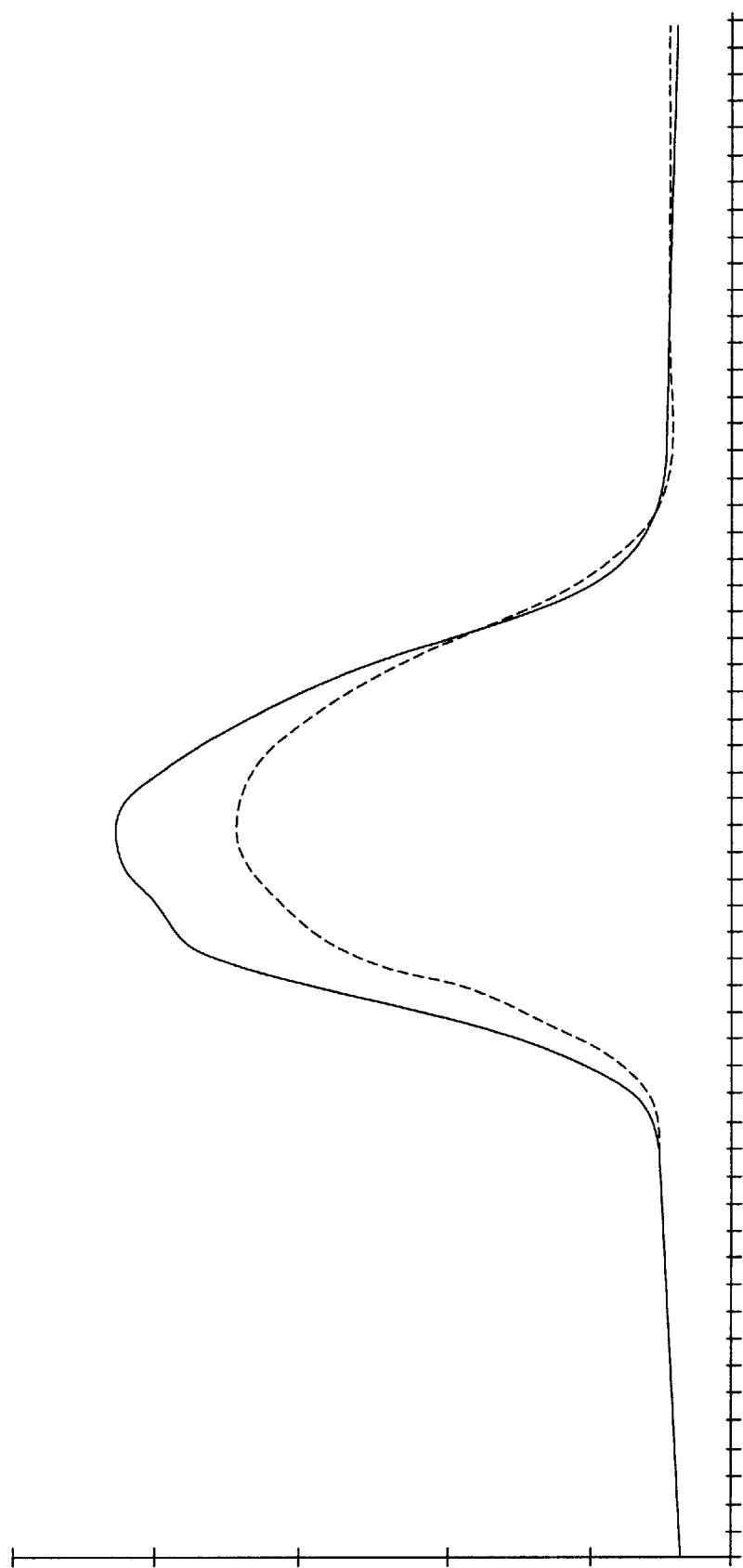

FIGS. 5a and 5b are diagrams showing in planes which are at right-angles the distances respectively between the object and the lighting source, and between the object and the diaphragm; and FIG. 6 is a graph showing the lighting profile which is obtained respectively with 4 diodes and 3 diodes disposed according to the invention.

Figure 1:
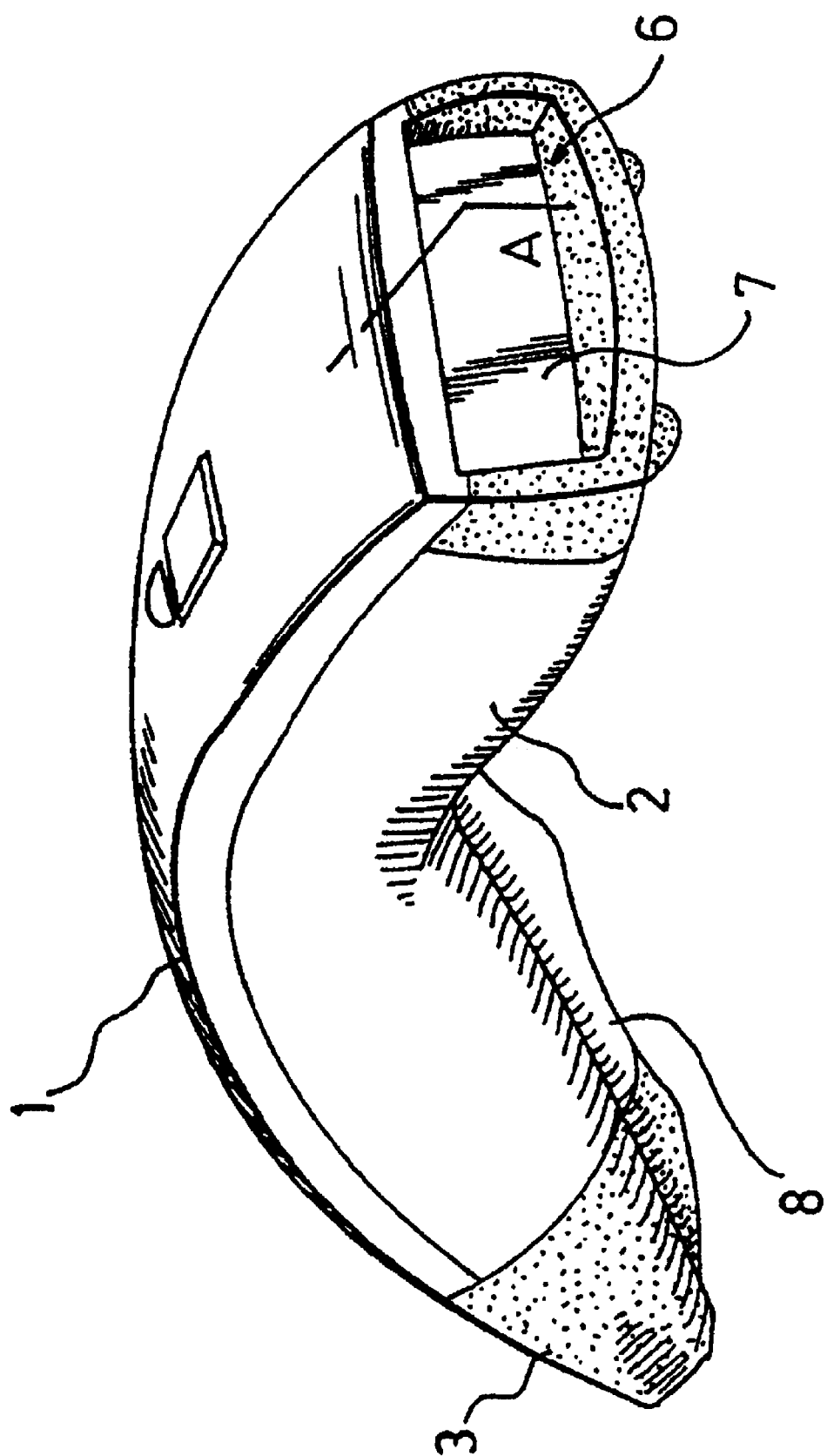
FIG. 1 is a perspective view of an optoelectronic device according to the invention.
Figure 2:
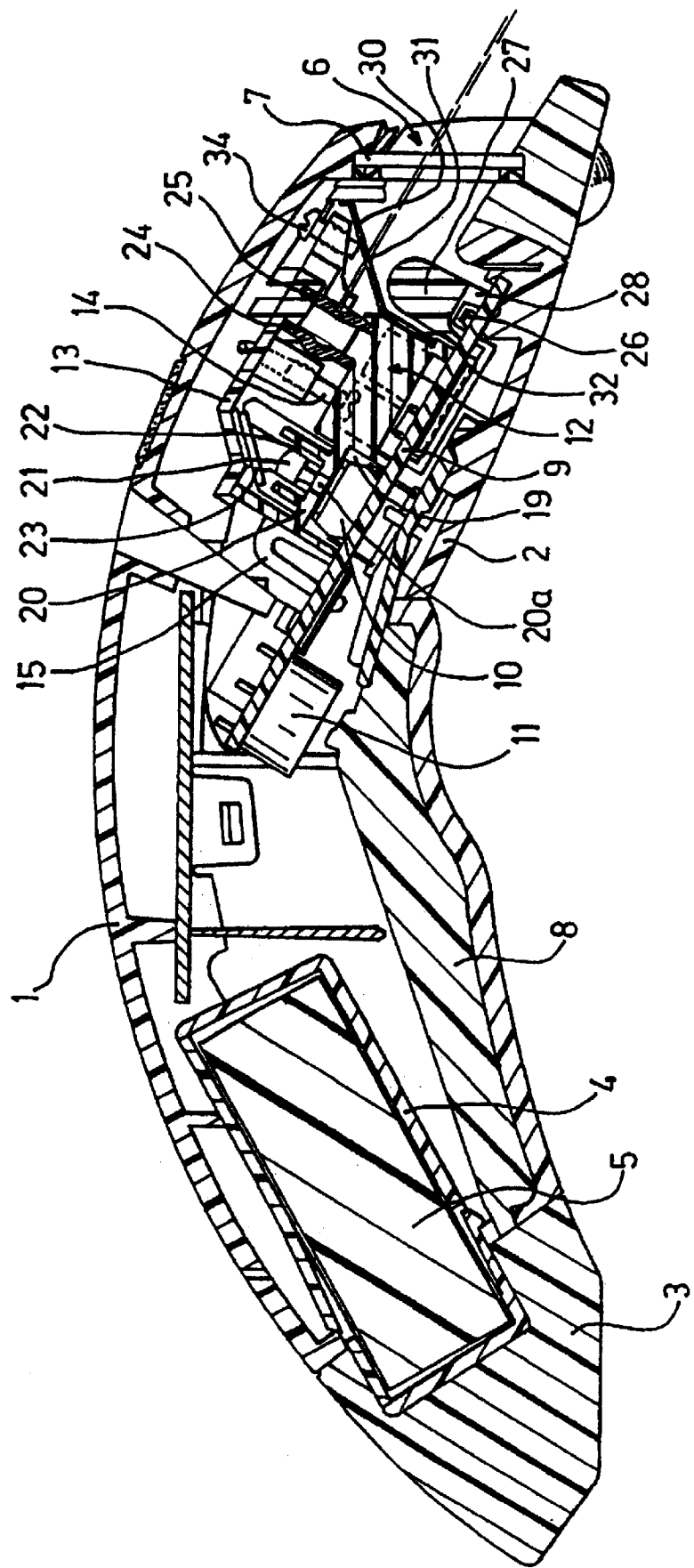
FIG. 2 is a longitudinal cross-section through an axial plane A.
Figure 3:
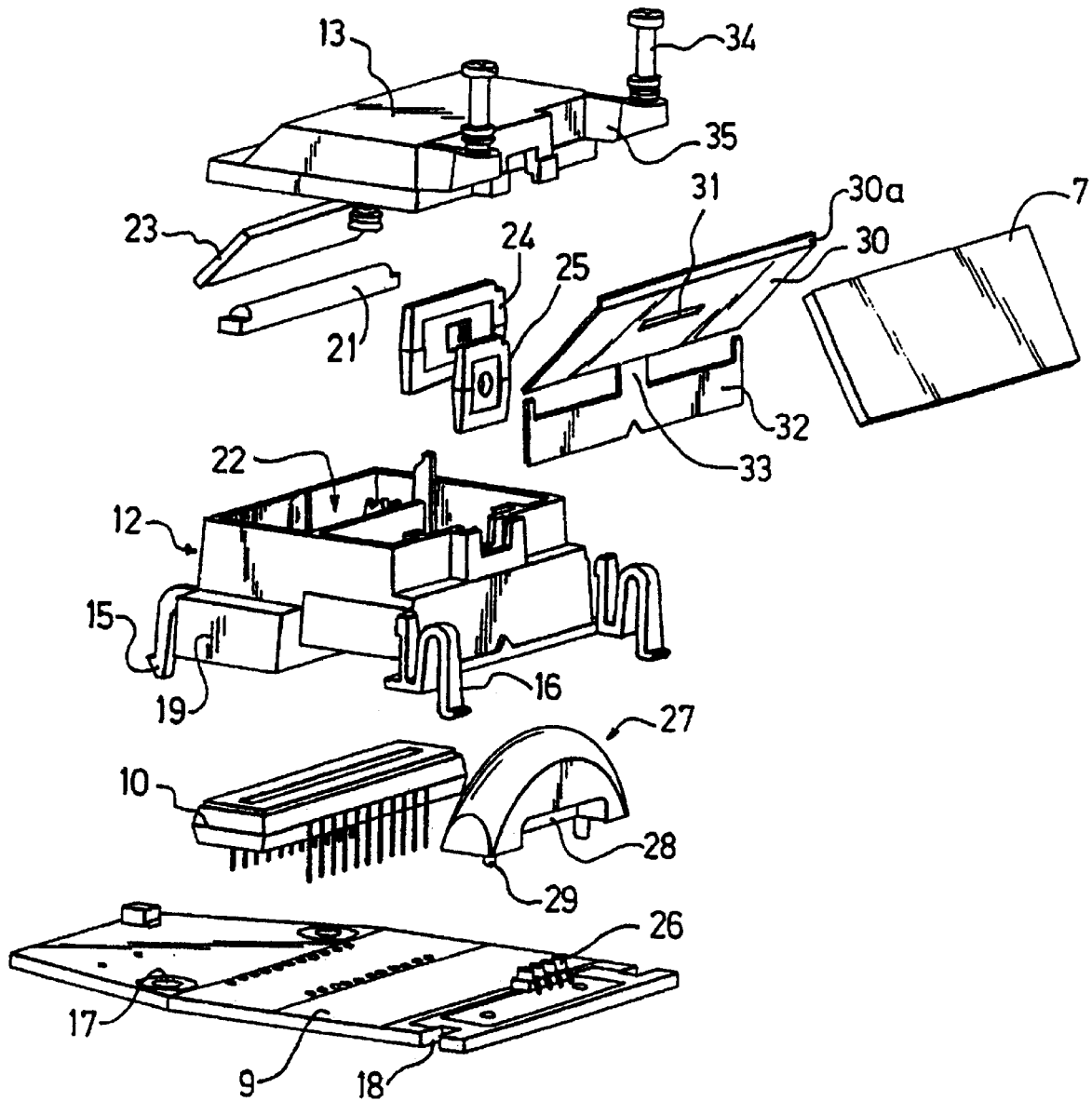
FIG. 3 is an exploded perspective view of the main components contained in the case of this optoelectronic device.
Figure 4A:
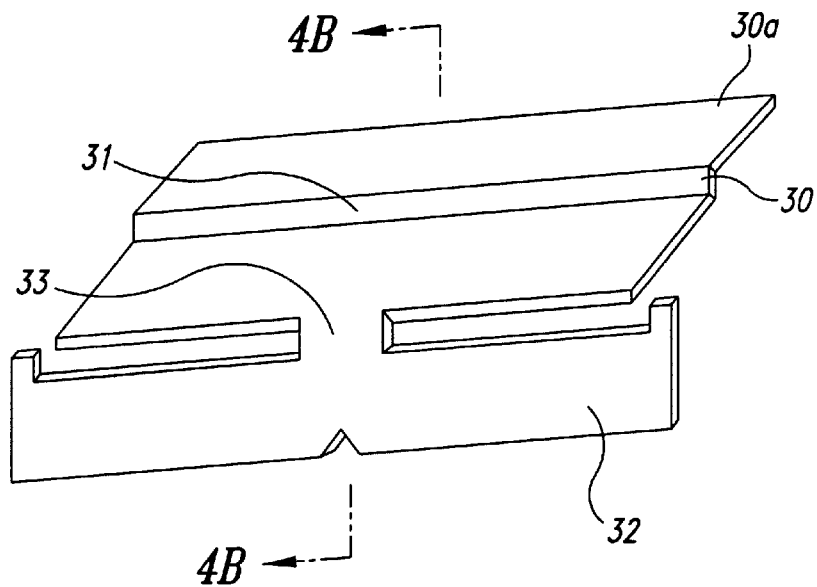
FIGS. 4a and 4b are views respectively in perspective and transverse cross-section through a plane B of the reflective surface of the lens according to the invention.
Figure 4B:
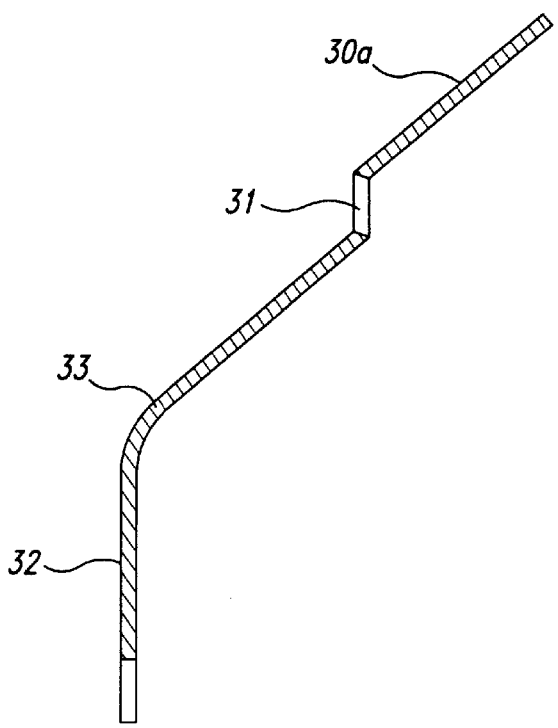

The optoelectronic device shown in FIGS. 1 and 2 consists of a bar code reader which is in the form of a case which is elbowed longitudinally, consisting of two shells 1, 2 which can be assembled by any known means, and a rear joining piece 3 which can be dismantled, and makes it possible to access a receptacle 4 for a battery 5.

At its front surface, this case additionally comprises an aperture 6, which is closed by a transparent window 7. This case also comprises a longitudinal trigger 8, which extends through an aperture which is provided in the lower shell 2, and is articulated towards the rear end of the said shell.

Inside this case there is accommodated an electronic card 9, to which there are connected firstly a linear CCD sensor 10, and conventional electronic processing and decoding components which permit piloting of the said sensor, and processing of the signals obtained from the latter.

There is also connected to this electronic card 9 a switch 11, which is disposed such that it can be actuated by the trigger 8.

The optical means of this reader are disposed inside a case 12, closed by a cover 13, which is rendered integral with the said case by means of screws 14. This case 12 additionally comprises four locking lugs such as 15, 16, which project relative to its front and rear walls, and are disposed such that they snap into notches such as 17,18 provided in the electronic card 9.

On its under-surface, and juxtaposed with the front surface of its rear wall, the case 12 additionally comprises a receptacle 19 for the CCD sensor 10, which is separated from the interior of the said case by means of a flat wall 20, which contains a transverse slot 20a.

The optical means comprise firstly a lens 21 which is so-called cylindrical, i.e. which has a dioptre with a semi-cylindrical shape, and is disposed transversely in a receptacle 22 of the case 12, which is superimposed on the receptacle 19 for the CCD sensor 10. This lens 21 has a 6 mm focal length, and is disposed at a distance of approximately 2.5 mm from the CCD reader 10.

A lens of this type does not give rise to any deflection of the rays of light, in a plane which is parallel to the optical plane, and is convergent in a plane which is perpendicular to the optical plane.

The optical means additionally comprise a mirror 23 which is inclined by 45° relative to the lens 21, and is rendered integral with the under-surface of a wall of the cover 13, which itself is inclined by 45°.

These optical means comprise a second, so-called acylindrical lens 24, which has a cross-section in the shape of an ogive. This lens 24 is fitted into grooves which are provided opposite in the case 12 and the cover 13. It has a focal length of 20 mm, and is disposed at a distance of 29 mm from the CCD sensor 10.

A lens of this type does not give rise to deflection of the rays of light in a plane which is perpendicular to the optical plane, and is convergent in the optical plane.

Finally, the optical means comprise a diaphragm 25, which is provided with a circular entrance pupil with a diameter of 4.5 mm, which is disposed at a distance of 5 mm from the lens 24, and is fitted into grooves which are provided opposite in the case 12 and the cover 13.

The means for lighting the reader are disposed directly downstream from the case 12. Firstly, they comprise four attached electro-luminescent diodes such as 26, which have an angle of diffusion which is between 120° and 130°. These four diodes 26 are connected to the electronic card 9, and are aligned according to an axis which is at right-angles to the optical axis.

These lighting means additionally comprise a convex lens 27 for focussing the light beam, in planes which are respectively parallel to, and perpendicular to the optical axis.

Firstly, this lens 27 comprises a flat dioptre, which is provided with a recess 28, which has a shape suitable for accommodating the diodes 26. In addition, this recess 28 is filled with a resin which has the same index of refraction as the lens 27.

This lens 27 additionally comprises two pins such as 29, which project relative to the flat dioptre of the lens, and allow the lens to be fitted onto the electronic card 9.

Finally, this lens 27 comprises a convex dioptre with a toroidal shape, which has two radii of curvature, respectively of 20 mm and 3.25 mm.

Finally, the lighting means comprise reflection means, which are disposed such as to intercept the light beams of the diodes 26, are inclined by an angle of 45°, and are designed such that the said light beams are centred on the optical axis.

These reflection means consist of a mirror 30 which has an upper stiffening edge 30a, and is provided with a transverse slot 31, which allows the image beam to pass through. This mirror 30 is also connected to a support plate 32 by means of a tab 33, which acts as an axis of articulation between the said mirror and support plate.

This support plate is designed to be accommodated in spaces provided between the front wall of the case 12 and the locking lugs 16, such that the slot 31 of the mirror 30 is centred on the optical axis, in which position the said slot is as close as possible to the diaphragm.

In addition, two screws, such as 34, each of which is disposed in a threaded bore provided in an arm such as 35, which projects relative to the front wall of the case 12, are designed to be supported on the mirror 30, such as to permit adjustment of the inclination of the latter, and/or to make it pivot relative to the support plate 32, in order to superimpose the light beam on the optical plane. It should be noted that during this adjustment, the presence of the stiffening edge 30a makes it possible to prevent the mirror 30 from warping.

Finally, and as shown schematically in FIGS. 5a and 5b, the mirror 30, the diodes 26 and the diaphragm 25 are disposed such that the virtual image of the light source, seen from the object, coincides with the entrance pupil of the diaphragm 25.

Lighting means of this type have several advantages:
  firstly, the arrangement of the attached diodes 26 makes it possible to obtain a lighting profile which, as shown in FIG. 5, decreases regularly if one of the diodes burns out, or if the brightness of the light source decreases over a period of time;

in addition, the optical area is perfectly delimited; and
finally, the depth of field of the reader is increased, owing to the quasi-absence of parallax error.

What is claimed is:

1. An optoelectronic device for acquisition of images of objects, comprising:
   a case having a reading window;
   an electronic scanning sensor received within the case;
   lighting means received within the case; and
   optical means including at least a lens received within the case which permit the formation of images on the sensor, wherein
      the sensor and the optical means define an optical axis, relative to which the reading window is centred;
      the sensor, reading window and the optical means delimit a useful optical reading field, which is subtended by an optical angle;
      the lighting means being positioned between the optical means and the reading window, and disposed such that an axis of a light beam from the lighting means intersects the optical axis; and
      reflection means allowing an image beam to pass through, and reflecting the light beam, being disposed such as to intercept the light beam;
      the reflection means being inclined relative to the optical axis, by an angle which is such that, after reflection, the light beam is centred on the optical axis;
      the reflection means, lighting means and lens being disposed such that the distance between the object and the lens is substantially identical to the distance between the object and the lighting means, wherein, in the optoelectronic device:
      the lighting means comprise a lighting source which is designed to light the useful optical field throughout the entire depth of the field;
      an angle a from which the lighting source is seen from an object plane, is such that $$\alpha \leq \text{Arctg} \frac{L}{5P},$$

in which L=width of the object plane, and
   P=the distance between the object and the lighting source.

2. The optoelectronic device as claimed in claim 1 wherein the reflection means comprise a reflective surface which is provided with a slot which is centred on the optical axis, and is disposed such as to intercept the light beam, the reflective surface being inclined relative to the optical axis, by an angle which is adapted such that the light beam reflected is centred on the optical axis.

3. The optoelectronic device as claimed in claim 2 wherein the reflective surface has vertically in its median portion the shape of an S, which is provided with a substantially vertical wing, in which the slot is provided.

4. The optoelectronic device as claimed in claim 3 wherein:
   the reflective surface is articulated on a fixed support, by means of an axial hinge system;
   adjustment means are disposed above the said reflective surface, such as to be supported on the latter, and to permit adjustment of its inclination, and/or to make it pivot.

5. The optoelectronic device as claimed in claim 4 wherein the adjustment means comprise two screws, which are disposed perpendicularly relative to each of the longitudinal ends of the reflective surface.

6. The optoelectronic device as claimed in claim 4 wherein the reflective surface comprises an upper stiffening edge.

7. The optoelectronic device as claimed in claim 1 wherein the lighting means comprise at least two diodes which are disposed one in the vicinity of the other, or in the vicinity of each other, the light beams of each diode substantially total overlapping throughout the entire depth of the field.

8. The optoelectronic device as claimed in claim 1 wherein the lighting means comprise diodes which have an angle of diffusion which is greater than the optical angle, and associated optical means which are disposed such as to intercept the light beam of the diodes, and are designed to make the light beam converge in the direction of reduction of the angles of emission, such as to reduce the latter to a value which is conjugated with that of the optical angle.

9. The optoelectronic device as claimed in claim 8 wherein the lighting means comprise four aligned electro-luminescent diodes which are disposed in the vicinity of one another.

10. The optoelectronic device as claimed in claim 8 wherein each electro-luminescent diode has an angle of diffusion which is between 120° and 130°.

11. The optoelectronic device as claimed in claim 8 wherein the optical means which are associated with the diodes comprise a convex focussing lens, which is designed to intercept the light beam for the diodes as a whole.

12. The optoelectronic device as claimed in claim 11 wherein the focussing lens comprises a convex dioptre with a toroidal shape.

13. The optoelectronic device as claimed in claim 11 wherein the focussing lens is a flat-convex lens, and comprises a flat dioptre which is provided with a recess designed to accommodate the electro-luminescent diodes.

14. The optoelectronic device as claimed in claim 13 wherein the recess of the flat dioptre of the focussing lens is filled with a resin which has the same refraction index as the lens.

15. The optoelectronic device as claimed in claim 1 wherein the lighting means are disposed such that, before reflection, the axis of the light beam is perpendicular to the optical axis.

16. An optical system for use in an imager, comprising:
   a light source;
   an optical sensor spaced from the light source; and
   a reflector positioned between the light source and the optical sensor, the reflector having a first reflective portion, a second reflective portion, and a wing spacing the second reflective portion from the first reflective portion, the second reflective portion being substantially parallel to the first reflective portion and the wing being non-parallel with the first and the second reflective portions, the wing having an opening therethrough to pass reflected light.

17. The optical system of claim 16 wherein the reflector has a ∫-shaped cross-section.

18. The optical system of claim 16 wherein the reflector further comprises a support plate and a tab resiliently connecting the support plate to the first reflecting portion.

19. The optical system of claim 16, further comprising:
   an adjustment mechanism engaging a portion of the reflector to vary an angle between the light source and the first and the second reflective portions.

20. The optical system of claim 16, further comprising:
a diaphragm positioned between the optical sensor and the reflector;
a first lens positioned between the diaphragm and the optical sensor, the first lens having an ogive shaped cross-section;
a mirror positioned between the first lens and the optical sensor; and
a second lens positioned between the mirror and the optical sensor, the second lens having a dioptre with a semi-cylindrical shape.

21. The optical system of claim 16 wherein the light source comprises:
at least two light emitting diodes; and
a focusing lens positioned between the at least two light emitting diodes and the reflector.

22. The optical system of claim 16 wherein the light source comprises:
a convex focusing lens having a cavity; and
at least two light emitting diodes received in the cavity of the focusing lens.

23. An optical imager to image an object plane, comprising:
a case having a window;
an optical sensor received in the case spaced from the window;
a light source received in the case; and
a reflector received in the case between the window and the optical sensor, the reflector having a reflective surface facing the window and the light source to direct light from the light source out of the window for illuminating the object plane, the reflector having an aperture formed therethrough to allow reflected light to pass to the optical sensor along an optical path extending between the window and the optical sensor.

24. The optical imager of claim 23, further comprising:
a diaphragm received in the case and positioned along the optical path between the reflector and the optical sensor;
a first lens received in the case and positioned along the optical path between the diaphragm and the optical sensor;
a mirror received in the case and positioned along the optical path between the first lens and the optical sensor; and
a converging lens received in the case and positioned between the mirror and the optical sensor.

25. The optical imager of claim 23 wherein the reflector is ∫-shaped.

26. An optical imager to image an object plane, comprising:
a case having a window;
an optical sensor received in the case spaced from the window;
a light source received in the case; and
a reflector received in the case between the window and the optical sensor, the reflector having a reflective surface facing the window and the light source to direct light from the light source out of the window for illuminating the object plane, the reflector having an aperture formed therethrough to allow reflected light to pass to the optical sensor along an optical path extending between the window and the optical sensor wherein the reflector includes a pair of parallel planar portions separated by a non-parallel planar wing portion, where the aperture is located in the wing portion.

27. An optical imager to image an object plane, comprising:
a case having a window;
an optical sensor received in the case spaced from the window;
a light source received in the case; and
a reflector received in the case between the window and the optical sensor, the reflector having a reflective surface facing the window and the light source to direct light from the light source out of the window for illuminating the object plane, the reflector having an aperture formed therethrough to allow reflected light to pass to the optical sensor along an optical path extending between the window and the optical sensor wherein the reflector includes a pair of parallel planar portions separated by a non-parallel planar wing portion, where the aperture is located in the wing portion and the wing portion is approximately perpendicular a portion of the optical path extending between the diaphragm and the window.

28. An optical imager to image an object plane, comprising:
a case having a window;
an optical sensor received in the case spaced from the window;
a light source received in the case; and
a reflector received in the case between the window and the optical sensor, the reflector having a reflective surface facing the window and the light source to direct light from the light source out of the window for illuminating the object plane, the reflector having an aperture formed therethrough to allow reflected light to pass to the optical sensor along an optical path extending between the window and the optical sensor wherein the reflector is positioned in the case to produce light at the object plane having an angle less than or equal to the arctangent of the quotient of a first value equal to a width of the object plane and a second value equal to a distance between the object plane and the light source.

29. The optical imager of claim 23 wherein the light source comprises:
a first light emitting diode received in the case;
a second light emitting diode received in the case adjacent the first light emitting diode; and
a focusing lens received in the case and positioned between the first and the second light emitting diodes and the reflector.

30. An optical imager to image an object plane, comprising:
a case having a window;
an optical sensor received in the case spaced from the window;

a light source received in the case;

a reflector received in the case between the window and the optical sensor, the reflector having a reflective surface facing the window and the light source to direct light from the light source out of the window for illuminating the object plane, the reflector having an aperture formed therethrough to allow reflected light to pass to the optical sensor along an optical path extending between the window and the optical sensor, wherein the light source comprises:

a focusing lens received in the case and having a cavity formed therein;

a first light emitting diode received in the cavity of the focusing lens;

a second light emitting diode received in the cavity of the focusing lens adjacent the first light emitting diode; and a resin having a refractive index matching a refractive index of the focusing lens received in the cavity of the focusing lens.

31. The optical imager of claim 23 wherein the reflector further comprises a support plate and a tab resiliently connecting the support plate to the first reflecting portion.

32. The optical imager of claim 23, further comprising:

an adjustment mechanism engaging a portion of the reflector to vary an angle between the light source and the first and the second reflective portions.

* * * * *